(12) United States Patent
Bono et al.

(10) Patent No.: US 6,482,254 B1
(45) Date of Patent: Nov. 19, 2002

(54) DEAERATOR INSERT

(75) Inventors: James Edward Bono, Midlothian, VA (US); Jiaying Li Mallon, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 61 days.

(21) Appl. No.: 09/712,674

(22) Filed: Nov. 14, 2000

(51) Int. Cl.$^7$ ............................................... B01D 19/00
(52) U.S. Cl. ............................... 96/194; 96/197; 96/198
(58) Field of Search ........................... 95/241, 247, 248, 95/262, 266; 96/193, 194, 197, 198, 220

(56) References Cited

U.S. PATENT DOCUMENTS

| | | | | |
|---|---|---|---|---|
| 1,592,647 A | * | 7/1926 | Speller | |
| 1,836,338 A | * | 12/1931 | Rodman et al. | |
| 2,041,059 A | | 5/1936 | French | |
| 2,146,532 A | | 2/1939 | Crane et al. | |
| 2,306,265 A | | 12/1942 | Heald | |
| 2,355,057 A | * | 8/1944 | Copeland | |
| 2,408,021 A | | 9/1946 | Hill | |
| 2,540,390 A | * | 2/1951 | Gorgerat et al. | |
| 2,570,171 A | * | 10/1951 | Von Kohorn et al. | |
| 2,684,728 A | | 7/1954 | Malm | |
| 2,714,938 A | * | 8/1955 | Smith | |
| 2,887,267 A | | 5/1959 | De Langen | |
| 3,116,999 A | * | 1/1964 | Armbruster | |
| 3,242,643 A | * | 3/1966 | Moore et al. | |
| 3,368,330 A | * | 2/1968 | Elliott et al. | |
| 4,002,432 A | * | 1/1977 | Brice et al. | |
| 4,338,100 A | * | 7/1982 | Wersosky et al. | |
| 4,341,534 A | * | 7/1982 | Burger | |
| 4,398,930 A | * | 8/1983 | Larson et al. | |
| 5,332,423 A | * | 7/1994 | Gisko et al. | |
| 5,509,954 A | * | 4/1996 | Derian et al. | |

* cited by examiner

Primary Examiner—Duane S. Smith

(57) ABSTRACT

The present invention is directed to an insert for a vacuum deaerator for receiving a liquid having gas entrained therein and distributing the liquid to a gas-disentrainment surface, with distributing structure being connected to the receiving structure to permit the liquid to flow from the receiving structure to the distributing structure, and at least one fin attached to and extending downwardly from the distributing structure to receive the liquid from the distributing structure and to provide a gas-disentrainment surface to aid removal of entrained gas from the liquid.

9 Claims, 2 Drawing Sheets

DEAERATOR INSERT

BACKGROUND OF THE INVENTION

1. Field of the Invention

This invention relates to an apparatus for the removal of air and other gases dissolved and entrained in liquids. More particularly it relates to the continuous removal of air and other gases from viscous liquid solutions such as viscose and other derivatives of cellulose.

2. Description of Related Art

Gas and air may become entrained in liquids in the form of bubbles, such as in the process of preparing liquid viscose solutions for the spinning of synthetic fibers. Should these gases and air bubbles be permitted to remain, broken filaments in the spun yarn would result when the viscose solution is extruded through the holes of spinnerets. Yarn thus produced would have a varying number of filaments and would therefore not be of uniform quality.

There are numerous processes for removing entrained air from liquids. For example, U.S. Pat. No. 2,684,728, discloses an apparatus for removing air from a viscose solution wherein the viscose solution is boiled and then continuously fed to a channel and trough from which the liquid overflows to spread as a thin film over supporting surfaces such as the interior wall of a tank and the exterior wall of a bell-shaped cylinder located within the lower portion of the tank.

U.S. Pat. No. 2,306,265, discloses an apparatus for degasifying viscous compositions by momentarily exposing a maximum surface of the material in the presence of a vacuum and then quickly returning the material to a body of minimum surface to prevent the evaporation of moisture and other volatile components. In this apparatus, the composition to be degasified uses a deaerator insert where the composition passes by gravity feed through channels and, upon emerging from those channels, is spread as a thin film on the inside wall of a cylindrical chamber that houses the insert. This film is thinner than the thickness of the gas bubbles entrained in the liquid so that the bubbles are caused to pop by the vacuum in the deaerator.

Attempts have been made to increase the available surface area for removing gases entrained in liquids. For example, U.S. Pat. No. 2,041,059, discloses an apparatus wherein a gas-containing liquid is subjected to a partial vacuum and then flows as a thin film over a succession of gently sloping conical surfaces with alternate cones inverted with respect to the others to increase the surface area and the points from which the gases evolve so as to further promote the rapid emission of gases from the liquid. However, a problem with these conical surfaces is that the thickness of the film is greater near the bottom of the cone than near the top of the cone and this increased thickness may be too large to allow the entrained gas to escape.

The inventors of the present invention have discovered an improved apparatus for removing entrained air and gases from liquids which provides a insert for a deaerator which provides a large surface area for removing gases entrained in liquids which overcomes the problems associated with the prior art.

BRIEF SUMMARY OF THE INVENTION

The present invention is directed to an insert for a vacuum deaerator that includes means for receiving a liquid having gas entrained therein, means for distributing the liquid to a gas-disentrainment surface, the distributing means being connected to the receiving means to permit the liquid to flow from the receiving means to the distributing means, and at least one fin attached to and extending downwardly from the distributing means to receive the liquid from the distributing means and to provide a gas-disentrainment surface to allow removal of entrained gas from the liquid.

DETAILED DESCRIPTION OF THE INVENTION

Figure 1:
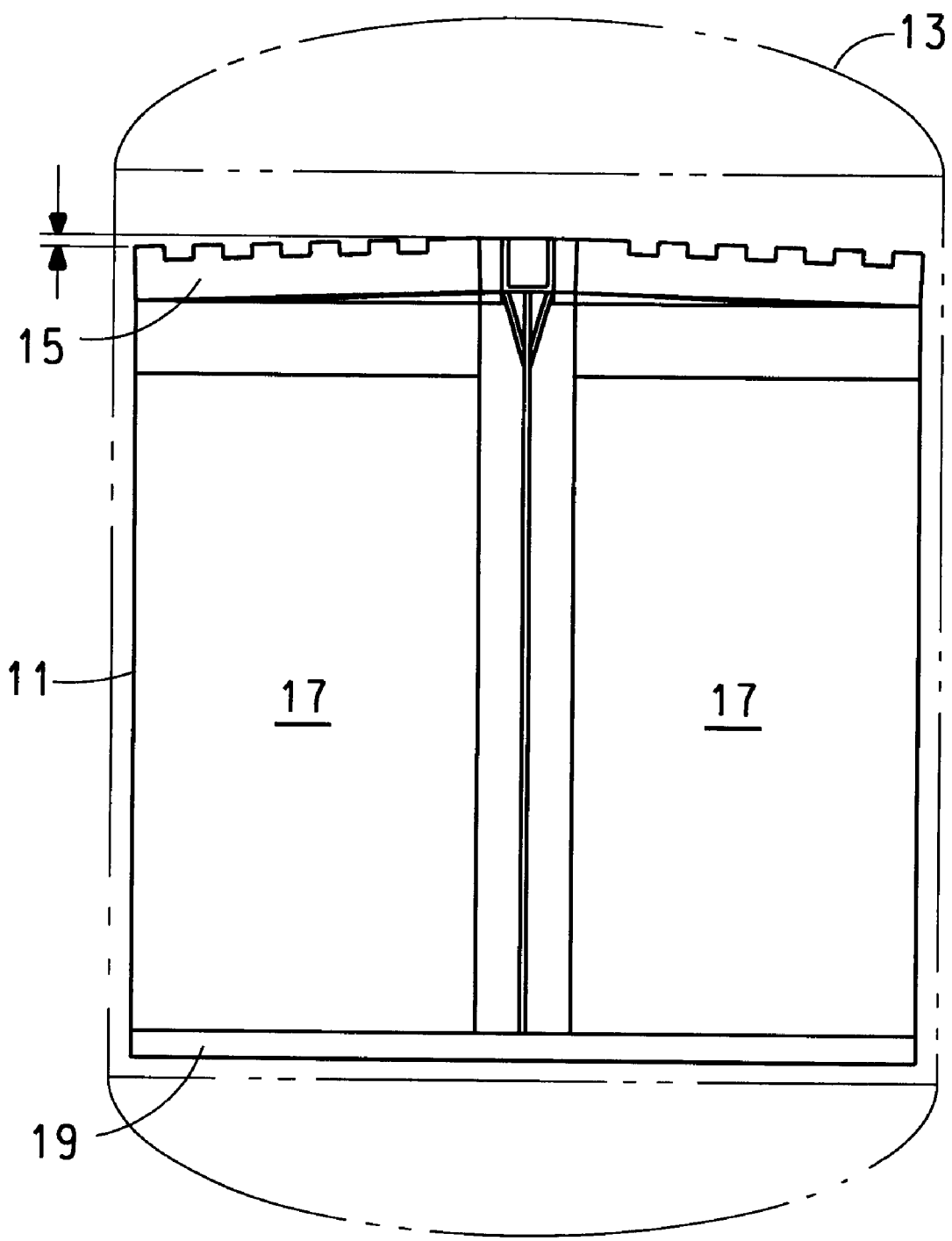
FIG. 1 is a side view in elevation of the insert for a deaerator of the invention.

The present invention is directed to an insert for a vacuum deaerator that is used to remove air and other gases dissolved and entrained in liquids. More particularly it is useful in the continuous removal of air and other gases from viscous liquid solutions such as viscose and other derivatives of cellulose.

The deaerator insert includes means for receiving a liquid having gas entrained therein, means for distributing the liquid to a gas-disentrainment surface, the distributing means being connected to the receiving means to permit the liquid to flow from the receiving means to the distributing means, and at least one fin attached to and extending downwardly from the distributing means to receive the liquid from the distributing means and to provide a gas-disentrainment surface to allow removal of entrained gas from the liquid.

The receiving means may be a central channel, trough, or other receptacle suitable for receiving liquid having entrained gases. The distributing means may also act as the receiving means.

The distributing means may be a channel, trough, aqueduct, tube or the like that is connected to the receiving means and which allows the liquid to flow from the receiving means, along or through the distributing means, and distribute the liquid onto a gas-disentrainment surface.

The distributing means should include at least one channel, trough, aqueduct, tube or the like, but may include a plurality thereof. There is no limitation as to how the plurality of channels, troughs, aqueducts, tubes or the like may be arranged. They may be spirally-shaped, or may extend radially outwardly from a central point such as the receiving means, or may be in the form of concentric circles or other shapes.

The distributing means may also include overflow control means to control the flow of liquid from the distributing means to the gas-disentrainment surface. If the distributing means is a channel, trough, aqueduct or the like, the overflow means can be a wall of varying height where that height is selected to control the flow of liquid over the wall of the distributing means in a desired manner. This overflow control means is particularly important when removing air and other gases from liquids that are viscous because viscous liquids by their nature do not flow well and may overflow the distributing means in undesirable locations. For example, if the distributing means is a plurality of channels that extend radially outwardly from a central point, the overflow control means may be a wall that decreases in height from the central point to the end of the distributing means so that the liquid flows over the wall along the distributing means from the central point to the distal end at approximately the same rate.

Alternatively, the overflow control means may be a plurality of weirs formed in the walls of the distributing means which permit the liquid to flow from the distributing means to the gas-disentrainment surface as a substantially uniform film along the gas-disentrainment surface. There is no criticality to the number of or location of the weirs provided the weirs perform the desired function. Normally, the weirs are spaced apart equally along both sides of the distributing means. Again, in the case of a viscous liquid where the distributing means includes a plurality of channels that extend radially outwardly from a central point, the liquid would have the tendency to overflow the channels nearer the central point. The use of weirs as an overflow control means permits the liquid to flow over the walls of the channel at the weirs before flowing over the walls of the channel nearer the central point.

The distributing means by necessity must include means for stopping the flow of the liquid through the distributing means so that the liquid flows over the distributing means and onto the gas-disentrainment surface. Typically this stopping means is a wall formed at an end of the distributing means.

If the distributing means is a tube, then the overflow control means can include a plurality of holes or openings formed in the tube to allow the liquid to flow onto the gas-disentrainment surface.

The distributing means may be angled downwardly from a first end of distributing means where the liquid enters the distributing means to a second end such that the liquid flows by gravity to the second end of the distributing means. The downwardly sloping angle can be selected to further control the manner in which the liquid overflows the walls of the distributing means.

At least one fin is attached to and extends downwardly from the distributing means to provide a gas-disentrainment surface to remove air or other gases from the liquid. As the liquid flows down on the surface of the fin, the liquid forms a very thin film. In order for the deaerator to operate properly and remove bubbles of entrained gas from the liquid, the film should be as thin as possible to allow for bubbles entrained in the liquid to move easily to the surface of the film and burst when subjected to vacuum.

If the distributing means includes a plurality of channels, troughs, aqueducts, tubes or the like, it is preferred that a fin is attached to each one of them. For example, if the distributing means is eight channels that extend radially outwardly from a central point, each of the channels has a fin attached thereto. Likewise, if the distributing means is in the form of a channels that are spiral-shaped or concentric, a fin is attached to each of the channels.

The fin may have a smooth surface or may have ridges, corrugations or other raised surfaces formed therein to increase the surface area of the fin provided such raised surfaces do not create liquid collection points on the fin. The ridges, corrugations and other raised surfaces may be formed in the fin in any of the x, y and/or z axes. Placing the ridges, corrugations and other raised surfaces at an angle other than vertical provides a way to control the flow of liquid down the fin.

The thickness of the fin is not critical to the invention. The fin may, for example, have the same width or thickness as the distributing means, but the fin should not be so thick or wide so as to impede undesirably the flow of liquid from the distributing means as that liquid moves onto the fin.

The fin may also include heating or cooling elements therein to alter the viscosity of the fluid as the fluid moves down the fin.

To facilitate the formation of the film and to prevent drops of liquid from dripping from the distributing means to the bottom of the deaerator without touching the fin, a drip plate may be positioned between the distributing means and the fin. The drip plate provides a surface that connects the distributing means and the fin and that allows liquid to flow smoothly from the distributing means onto the fin.

Alternatively, the distributing means may be shaped in such a way so as to allow liquid to flow on the outer walls of the distributing means and onto the fin. For example, the distributing means may be a channel, trough, aqueduct or the like that is V-shaped or C-shaped in cross section with the V-shape or C-shape formed so as to allow liquid to flow on the outer walls thereof and flow smoothly onto a fin.

The inventive insert is designed for use in a vacuum deaerator. Such deaerators typically operate under a vacuum of 28 or more inches of mercury. When used to deaerate viscose, it is preferred that the vacuum not be below 26 inches of mercury. The vacuum allows small bubbles of gas or air entrained in the liquid to expand to a size where the bubbles can burst through the film of liquid as the liquid moves down the gas-disentrainment surface.

There is no limitation on the material from which the deaerator insert may be made.

Turning now to the drawings there is shown in FIG. 1 a deaerator insert 11 for use in a vessel 13. Deaerator insert 11 comprises a channel section 15 and fins 17. Fins 17 are supported at their distal end by a circular support ring 19 which connects and supports fins 17.

Figure 2:
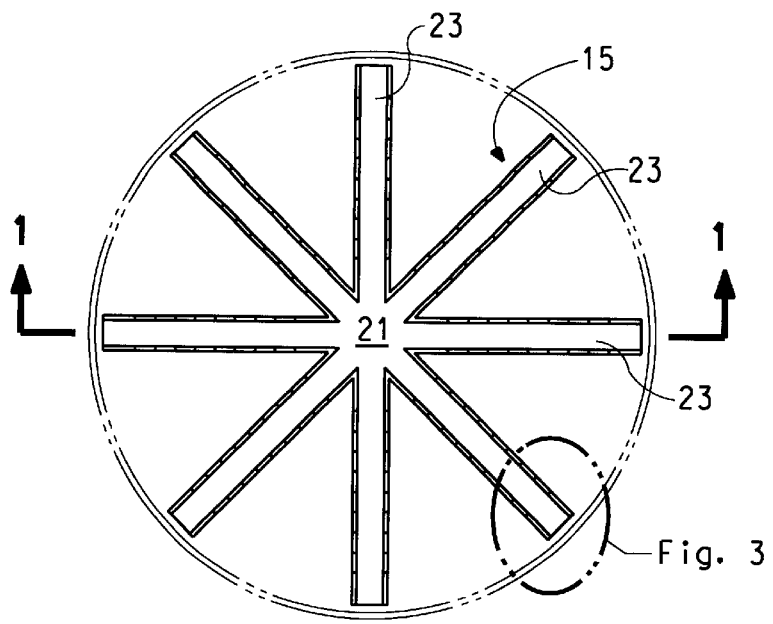
FIG. 2 is a top plan view of the deaerator insert of FIG. 1.

Details of channel section 15 are further illustrated in FIG. 2 where channel section 15 is shown to include a liquid receiving section 21 and eight channels 23 that radiate outwardly from receiving section 21 in an 8-point star pattern. There is one fin 17 attached to each channel 23.

Figure 3:
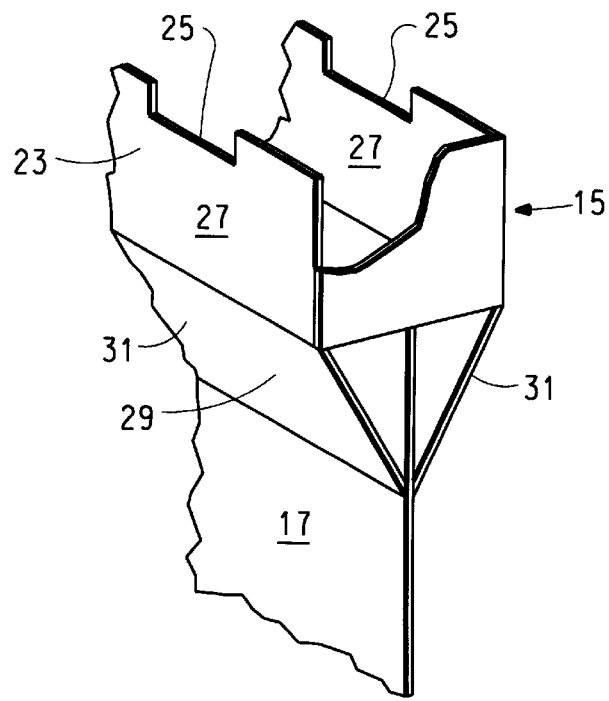
FIG. 3 is a view in perspective of an end portion of the deaerator insert.

As shown in FIG. 3, channels 23 may include weirs 25 formed in channel side walls 27. Five weirs 25 are formed in each side wall 27 of each channel 23. Channels 23 are sloped downwardly from liquid gathering section 21 to allow liquid to flow by gravity to the distal end of channels 23.

Deaerator insert 11 may also include a drip plate 29 positioned between channels 23 and fins 17. As shown in FIG. 3, drip plate 29 includes two walls 31, with each wall connected at one end to a channel side wall 27 and at the other end to the top of a fin 17. Drip plate 29 provides a means for the liquid overflowing channel side walls 27 to reach fins 17 in a manner so as to provide a substantially uniform film thickness.

There is no limitation on vessel 13 although it is preferred that vessel 13 is a deaeration apparatus that operates under vacuum.

In operation, liquid having air or other gases entrained therein enters vessel 13 and is collected in liquid receiving section 21 of channel section 15. The liquid flows by gravity to the distal ends of channels 23 where the liquid collects until it reaches a sufficient height in channels 23 to overflow channel side walls 27 or, if present, weirs 25. The liquid flows down the outside of channel side walls 27, and, if present, along drip plate 29 and onto fins 17 where the liquid coalesces into a substantially uniform film. As the liquid film flows down fins 17, the film is exposed to a vacuum to allow entrained bubbles of air or other gases to be extracted.

Channels 23 are shown to be rectangular but their shape is not critical to the invention.

While deaerator insert 11 is shown to have eight fins 17 and eight channels 23 the number of fins 17 and channels 23 is not critical to the invention provided that sufficient surface area is provided to allow satisfactory removal of the gas and/or air bubbles entrained in the liquid.

The dearator insert of the present invention is particularly useful in improving the performance of existing vacuum deaerators. In retrofitting such existing vacuum deaerators, the invention provides a greatly increased air-disentrainment surface area for a given vacuum deaerator volume compared to conventional deaerator inserts. This increased air-disentrainment surface area permits a decrease in the thickness of the liquid film that flows down fins compared to the film thickness in conventional deaerator inserts which improves the rate of mass transfer of gas out of the liquid.

What is claimed is:

1. An insert for a vacuum deaerator comprising
   means for receiving a liquid having gas entrained therein,
   means for distributing the liquid radially outward from the receiving means to a gas-disentrainment surface, the distributing means being present in a plurality and connected to the receiving means to permit the liquid to flow from the receiving means to the distributing means, and
   at least one fin attached to and extending downwardly from the distributing means to receive the liquid from the distributing means and to provide a gas-disentrainment surface to allow removal of entrained gas from the liquid.

2. The insert of claim 1, comprising a plurality of channels that extend radially outwardly from the receiving means.

3. The insert of claim 1, wherein the distributing means includes overflow control means to control the flow of liquid over the distributing means at specific locations along the distributing means.

4. The insert of claim 3, wherein the overflow control means includes a plurality of weirs formed in the distributing means.

5. The insert of claim 1, wherein the distributing means comprises at least one tube having openings formed therein along the length thereof to permit liquid to flow out of the tube.

6. The insert of claim 1, wherein the distributing means are angled downwardly from a first end of distributing means where the liquid enters the distributing means to a second end such that the liquid flows by gravity in the direction of the second end.

7. The insert of claim 1, further comprising a drip plate positioned between the distributing means and the fin.

8. A vacuum deaerator that includes the deaerator insert of claim 1.

9. The insert of claim 1, wherein the distributing means is spirally-shaped or in the form of concentric circles.

* * * * *